April 11, 1967 F. C. BOGUSCH, JR., ET AL 3,313,024
POWER-OPERATED CUTTING TOOL
Filed July 16, 1965
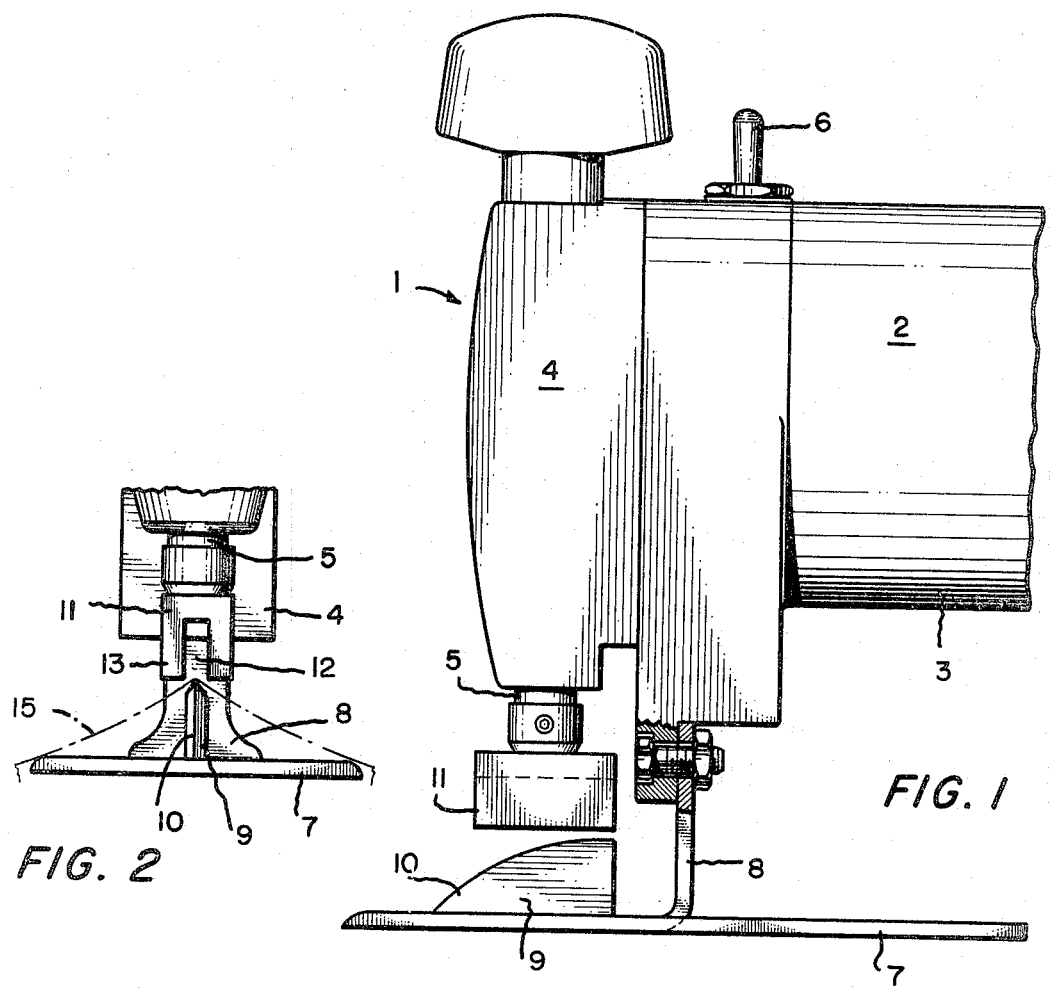
FIG. 2
FIG. 1
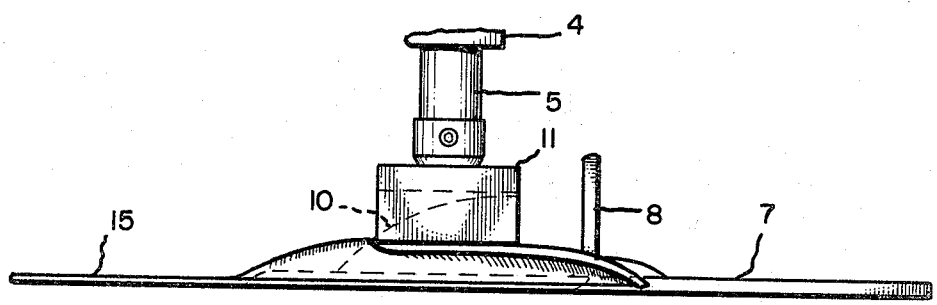
FIG. 3
INVENTORS
FRANK C. BOGUSCH, JR.
JAMES A. DE CARTERET
BY
David W. Tibbetts
ATTORNEY 3,313,024
POWER-OPERATED CUTTING TOOL
Frank C. Bogusch, Jr., Greenfield, and James A. DeCarteret, Bernardston, Mass., assignors to Millers Falls Company, Greenfield, Mass., a corporation of Massachusetts
Filed July 16, 1965, Ser. No. 472,453
3 Claims. (Cl. 30—273)

This invention relates to portable power-operated cutting tools, such as rug or fabric cutters.

The principal object of this invention is to provide a simple, economical, and effective power-operated cutting tool which can be used for cutting flexible sheet material, such as fabrics, carpets, et cetera.

Other important objects of this invention include the following: to provide a novel power-operated fabric cutting tool; to provide a power-operated cutting tool mechanism which can be attached to conventional power-operated portable sabre saws or jig saws; to provide a power-operated fabric cutting mechanism of extremely simple construction; to provide a power-operated cutter having a type of operation providing a high degree of protection against cutting injuries to personnel; and to provide a power-operated cutting mechanism which eliminates the need for moving knives or blades.

In brief, the invention comprises a tool frame supporting a vertical reciprocating tongue extending downwardly and an upstanding stationary cutter blade mounted on the tool frame below the reciprocating tongue. A presser foot is fixed on the lower end of the reciprocating tongue and arranged to press a work sheet, located between the presser foot and the cutter blade, against the blade to cut the work sheet progressively from the bottom face of the work sheet as the tool is moved along the work sheet. The cutter blade is arranged with the space on each side of the blade being unobstructed so that the work sheet can rest on the blade and depend downwardly on both sides of the blade. Preferably, the presser foot has a slot adapted to receive the upstanding cutter blade as the presser foot reciprocates.

The invention is illustrated in the accompanying drawing wherein:

FIG. 1 is a side elevational view with portions cut away of the invention attached to a conventional sabre saw;

FIG. 2 is a fragmentary elevational view showing the front end of the tool shown in FIG. 1; and FIG. 3 is a fragmentary view illustrating the operation of the tool in cutting a fabric.

The fabric cutting tool 1 illustrated in the drawings includes a conventional sabre saw 2 having a motor 3 and a tool frame 4. The tool frame 4 includes a reciprocating tongue 5 driven by the motor 3. A switch 6 mounted on top of the sabre saw 2 controls the operation of the motor 3. All of the foregoing structure is conventional.

The novel cutting mechanism of this invention includes a relatively large sole plate 7 located beneath the tool frame 4 and connected thereto by a relatively narrow upstanding leg 8 which is an integral portion of the plate 7. The leg 8 is detachably mounted to the tool frame 4 by a conventional fastening means, such as the bolt shown in the drawing. A cutter blade 9 is attached to the top surface of the sole plate 7 and is arranged with a cutting edge 10 projecting upwardly toward the reciprocating tongue 5. The cutting edge 10 curves arcuately forwardly and downwardly toward the sole plate 7 so that a work sheet, such as a fabric or rug will tend to ride up on the cutting edge 10 as the tool is fed into the work sheet.

A presser foot 11 is attached to the outer end of the reciprocating tongue 5 and is located immediately over the cutter blade 9. The presser foot 11 includes a slot or kerf 12 extending along its lower face adapted to receive the cutting edge 10 as the presser foot 11 reciprocates with the tongue 5. The formation of the kerf 12 provides the presser foot 11 with a pair of downwardly extending toes 13 arranged to straddle the cutter edge 10 as the cutter blade 9 enters the slot 12.

OPERATION

The tool is used by feeding the sole plate 7 beneath a work sheet 15 as shown in FIG. 3, and in dotted lines in FIG. 2. This work sheet will normally be a fabric, such as a carpet, for example. As the sole plate is fed beneath the work sheet 15, the motor 3 will be reciprocating the reciprocating tongue 5, causing the presser foot 11 to rapidly move up and down over the cutter blade 9. At the upper end of the stroke of the presser foot 11, it will be raised entirely above the cutting edge 10, while at the lower end of its stroke, it will be straddling the cutting edge 10. As the tool 1 is fed into the work, the work sheet 15 will ride up on the cutting edge 10 and the reciprocating presser foot 11 will progressively press the work sheet downwardly over the cutting edge 10, causing the cutting edge to sever the work sheet progressively as the tool is moved along the work.

This mechanism provides an extremely simple and economical structure for cutting flexible sheet material, such as fabrics and carpets, while it provides a high degree of safety to personnel adjacent the tools, since it does not contain any moving blades. Furthermore, the mechanism can be manufactured as an attachment for conventional reciprocating portable tools, such as sabre saws or jig saws.

While a preferred embodiment of the invention has been illustrated and specifically described, it should be recognized that the invention can be changed in various ways or aspects without changing the general concept of the invention. Therefore, this invention may embrace other embodiments which are obvious from an understanding of the described embodiment and are embraced within the scope of the claims of the invention.

Having described our invention, we claim:
1. A cutting tool comprising:
  a tool frame containing a tongue mounted for reciprocation in said frame and a motor driving said tongue causing it to reciprocate;
  an elongated cutter blade located near one end of said reciprocating tongue with a cutting edge extending forwardly and toward said one end of said tongue;
  means mounted on said tool frame and supporting said blade with the space on each side of said blade being free from obstructions so that when said tool is orientated with the cutting edge projecting upwardly, a work sheet resting on said cutting edge will depend downwardly on both sides of the blade; and
  a presser foot mounted on said one end of said reciprocating tongue and arranged to press the work sheet located between said foot and said blade against said blade to cut said work sheet progressively from the bottom face of the work sheet as said tool is moved along said work sheet;

said presser foot including a slot adapted to receive said cutting edge as said presser foot reciprocates.

2. The cutting tool of claim 1 wherein:

said blade is mounted on a relatively large sole plate adapted to move along the opposite side of said work sheet from the side engaged by said presser foot.

3. The cutting tool of claim 2 wherein:

said means for supporting said cutter blade includes a relatively narrow leg extending between said sole plate and said tool frame;

said leg being adapted to extend through the cut made in said work sheet as said tool is moved along said work sheet.

References Cited by the Examiner

UNITED STATES PATENTS

| 495,174 | 4/1893 | Van Vradenburg | 30—273 |
| 833,470 | 10/1906 | Lipowsky | 83—570 |
| 2,220,223 | 11/1940 | Eerhard et al. | 30—277 |
| 2,496,365 | 2/1950 | Aaron | 30—273 |

JAMES L. JONES, JR., *Primary Examiner.*